(12) United States Patent
Kotik

(10) Patent No.: US 11,152,670 B2
(45) Date of Patent: Oct. 19, 2021

(54) OFFSET BUS BAR CURRENT COLLECTORS

(71) Applicants: Robert Bosch Battery Systems LLC, Orion, MI (US); Robert Bosch GmbH, Stuttgart (DE)

(72) Inventor: Mark Kotik, Rochester Hills, MI (US)

(73) Assignees: Robert Bosch Battery Systems LLC, Orion, MI (US); Robert Bosch GmbH, Stuttgart (DE)

(*) Notice: Subject to any disclaimer, the term of this patent is extended or adjusted under 35 U.S.C. 154(b) by 291 days.

(21) Appl. No.: 16/212,140

(22) Filed: Dec. 6, 2018

(65) Prior Publication Data

US 2020/0185685 A1 Jun. 11, 2020

(51) Int. Cl.
*H01M 2/24* (2006.01)
*H01M 50/502* (2021.01)
*H01M 10/613* (2014.01)
*H01M 10/6556* (2014.01)
*H01M 50/116* (2021.01)

(52) U.S. Cl.
CPC ....... *H01M 50/502* (2021.01); *H01M 10/613* (2015.04); *H01M 10/6556* (2015.04); *H01M 50/116* (2021.01); *H01M 2220/20* (2013.01)

(58) Field of Classification Search
CPC .. H01M 2/206; H01M 2/0285; H01M 10/613; H01M 10/6556; H01M 2220/20
See application file for complete search history.

(56) References Cited

U.S. PATENT DOCUMENTS

| | | | |
|---|---|---|---|
| 8,945,746 B2 | 2/2015 | Kwag et al. | |
| 9,219,262 B2 | 12/2015 | Kimura et al. | |
| 2005/0079408 A1 | 4/2005 | Hirano | |
| 2009/0297892 A1* | 12/2009 | Ijaz | B23K 26/242 |
| | | | 429/7 |
| 2013/0230761 A1* | 9/2013 | Okutani | H01M 2/202 |
| | | | 429/158 |
| 2019/0296311 A1* | 9/2019 | Campbell | B60L 50/64 |

* cited by examiner

*Primary Examiner* — Jane J Rhee
(74) *Attorney, Agent, or Firm* — Kelly McGlashen; Maginot, Moore & Beck LLP

(57) ABSTRACT

A battery system includes a pair of current collectors that are configured to provide a parallel electrical connection between electrochemical cells of a cell array. The pair of current collectors includes a first current collector plate that provides an electrical connection between the ends of the respective cells, and a second current collector plate that includes openings that receive the cells therein, and provide an electrical connection between the sidewalls of the respective cells. The current collectors are each on the same end of the cells and the opposed end of the cell can be protected or electrically isolated for a multitude of functions, such as cell cooling.

17 Claims, 5 Drawing Sheets

OFFSET BUS BAR CURRENT COLLECTORS

BACKGROUND

Battery packs provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs are formed of a plurality of battery modules, where each battery module includes several electrochemical cells. The cells are arranged in arrays and are electrically connected in series or in parallel. For example, to obtain a parallel cell-to-cell electrical connection among the cells of a cell array, some conventional battery modules include a first current collector or bus bar that provides an electrical connection between respective first terminals at one end of the cells, and a second current collector or bus bar that provides an electrical connection between respective second terminals at an opposed end of the cells. Because electrical connections are needed at each end of the cells of the array, it becomes challenging to provide a battery module having efficient space management. Moreover, when current collectors are disposed at each of the opposed ends of the cell, cell cooling via immersion in a liquid coolant is also challenging.

SUMMARY

In some aspects, a battery module includes a first current collector, a second current collector and at least one electrochemical cell. The first current collector includes an electrically conductive first plate having a first plate first surface, a first plate second surface that is parallel to the first plate first surface, and a first plate peripheral edge that extends between the first plate first surface and the first plate second surface. The second current collector includes an electrically conductive second plate having a second plate first surface, a second plate second surface that is parallel to the second plate first surface, a second plate peripheral edge that extends between the second plate first surface and the second plate second surface and an opening that extends between the second plate first surface and the second plate second surface. Each cell includes a cell housing having a cell housing first end that has a first polarity and serves as a first terminal of the cell, and a cell housing second end that is opposed to the cell housing first end. Each cell includes a cell housing sidewall that extends between the cell housing first end and the cell housing second end. The cell housing sidewall has a second polarity and serves as a second terminal of the cell. The second polarity is different from the first polarity. The cell is disposed in the opening in such a way that cell housing sidewall directly contacts the opening and is electrically connected to the opening. In addition, the first plate second surface directly contacts the cell housing first end and is electrically connected to the cell housing first end.

In some embodiments, the cell housing has a midpoint that is mid way between the first end and the second end, and the second current collector is disposed between the midpoint and the cell housing first end.

In some embodiments, the cell housing sidewall is press fit in the opening.

In some embodiments, the cell housing sidewall is joined to the opening via a weld.

In some embodiments, the cell housing sidewall is electrically isolated from the cell housing first end.

In some embodiments, the cell housing includes a longitudinal axis that extends through the cell housing first end and the cell housing second end, and the first current collector is spaced apart from the second current collector in a direction parallel to the longitudinal axis.

In some embodiments, the battery module includes a cell holder that includes a base and a cell holder sidewall that is joined at one end to the base and protrudes from the base in a direction that is perpendicular to a surface of the base.

In some embodiments, the at least one cell is disposed in the cell holder so as to be surrounded by the cell holder sidewall, and the second current collector closes an end of the cell holder sidewall that is opposed to the one end.

In some embodiments, an interior surface of the cell, holder sidewall is contoured to provide vacancies having a shape and dimensions that correspond to the shape and dimensions of at least a portion of an outer surface of the cell housing.

In some embodiments, a cooling channel is provided in the cell holder sidewall, the cooling channel including an inlet that permits coolant to be provided to the cell holder, and an outlet that permits coolant to be discharged from the cell holder.

In some aspects, a battery module includes an array of electrochemical cells, a first current collector and a second current collector. Each cell of the array includes each cell includes a cell housing having a cell housing first end that has a first polarity and serves as a first terminal of the cell, a cell housing second end that is opposed to the cell housing first end, a longitudinal axis that extends between the cell housing first end and the cell housing second end, and a cell housing sidewall that extends between the cell housing first end and the cell housing second end. The cell housing sidewall has a second polarity and serves as a second terminal of the cell. The second polarity is different from the first polarity. The first current collector includes a first plate that is disposed at the first end of the cell housing, and is electrically connected to at least one of the first terminals of the cells of the cell array. In addition, the second current collector includes a second plate that is disposed at the first end of the cell housing, is electrically connected to at least one of the second terminals of the cells of the cell array, and is parallel to the first current collector. The second current collector overlies the first current collector along an axis that is parallel to the longitudinal axis of the cells, and is spaced apart from the first current collector.

In some embodiments, the cell housing has a midpoint that is mid way between the first end and the second end, and the second current collector is disposed between the midpoint and the first current collector.

In some embodiments, the second current collector includes a second plate first surface, a second plate second surface that is parallel to the second plate first surface, and a second plate peripheral edge that extends between the second plate first surface and the second plate second surface. The second current collector also includes an opening that extends between the second plate first surface and the second plate second surface. The opening is shaped and dimensioned to receive the cell housing sidewall therein.

In some embodiments, the opening is shaped and dimensioned to receive the cell housing sidewall therein in a press fit configuration.

In some embodiments, the first current collector is free of openings that are shaped and dimensioned to receive the cell housing sidewall therein.

In some embodiments, the battery module includes a cell holder that includes a base and a cell holder sidewall that is joined at one end to the base and protrudes from the base in a direction that is perpendicular to a surface of the base. The at least one cell is disposed in, the cell holder so as to be surrounded by the cell holder sidewall, and the second current collector closes an end of the cell holder sidewall that is opposed to the one end.

In some embodiments, an interior surface of the cell holder sidewall is contoured to provide vacancies having a shape and dimensions that correspond to the shape and dimensions of at least a portion of an outer surface of the cell housing.

In some embodiments, a cooling channel is provided in the cell holder sidewall, the cooling channel including an inlet that permits coolant to be provided to the cell holder, and an outlet that permits coolant to be discharged from the cell holder.

In some aspects, the battery module includes an array of electrochemical cells that are electrically connected by a pair of current collectors. Each cell of the array includes a cell housing. The cell housing includes a container portion having a first polarity, for example a negative polarity, and a lid portion that closes an open end of the container portion and has a second polarity, for example a positive polarity. The lid portion is electrically isolated from the container portion. The pair of current collectors includes a first current collector and a second current collector. The first current collector has the form of a thin plate that provides an electrical connection between the lid portions of the cells of the cell array. The electrical connection between the first current collector and the respective lid portions is achieved via conventional methods such as welding. The second current collector has the form of a thin plate and is arranged in parallel with the first current collector. The second current collector includes openings that receive the container portion, and an electrical connection is provided between the second current collector and the container portion via a press fit of the container portion within the respective opening, or via a weld that joins the container portion to the respective opening. The second current collector is spaced apart from the first current collector so as to maintain an electrical isolation from the first current collector, the first and second current collectors are located at one end of the cell, for example on opposed sides of the seal that isolates the lid portion from the container portion.

The first and second current collectors provide a parallel electrical connection between the terminals of a first cell and the corresponding terminals of a second cell. The first and second current collectors are configured so that the first and second current collectors are in close proximity to each other at one end of the cell, allowing for ease of integration into the electrical system and enabling cooling and isolation functions via a battery module housing.

DETAILED DESCRIPTION

Figure 1:
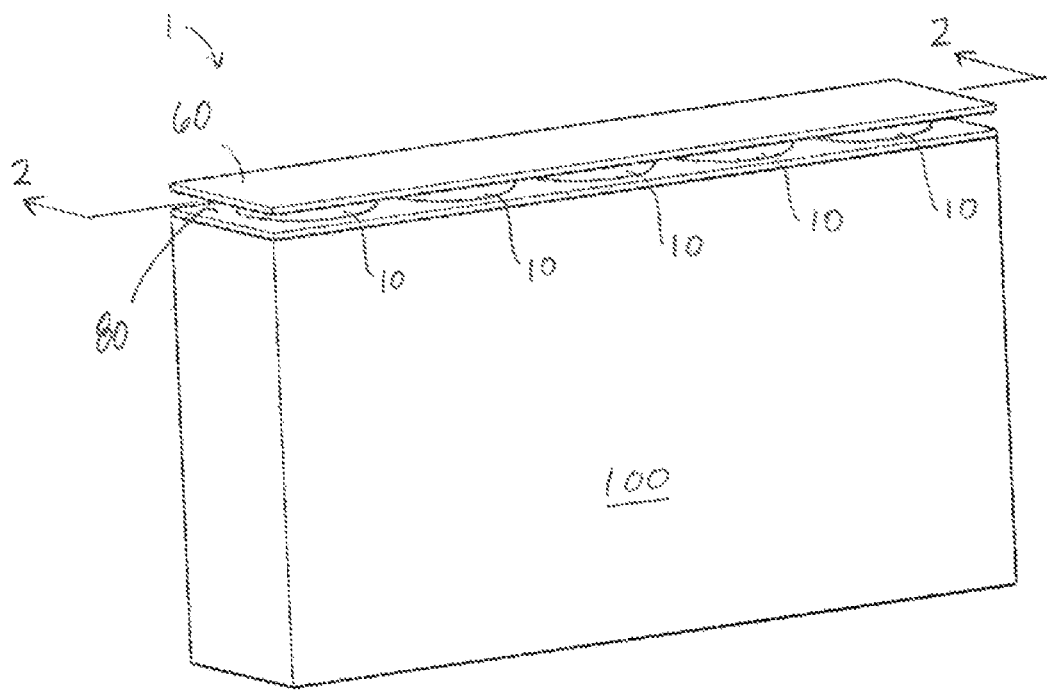
FIG. 1 is a perspective view of a battery module in which electrochemical cells are electrically connected via first and second current collectors.
Figure 2:
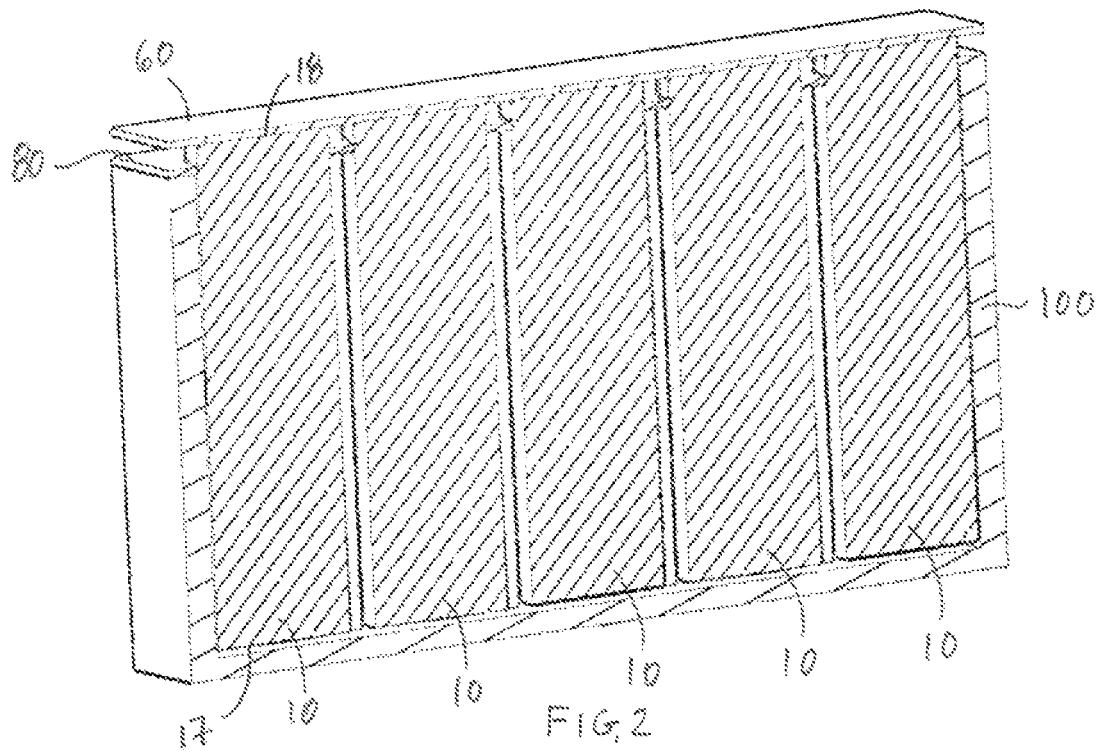
FIG. 2 is a perspective cross sectional view of the current collector as seen along line 2-2 of FIG. 1.
Figure 3:
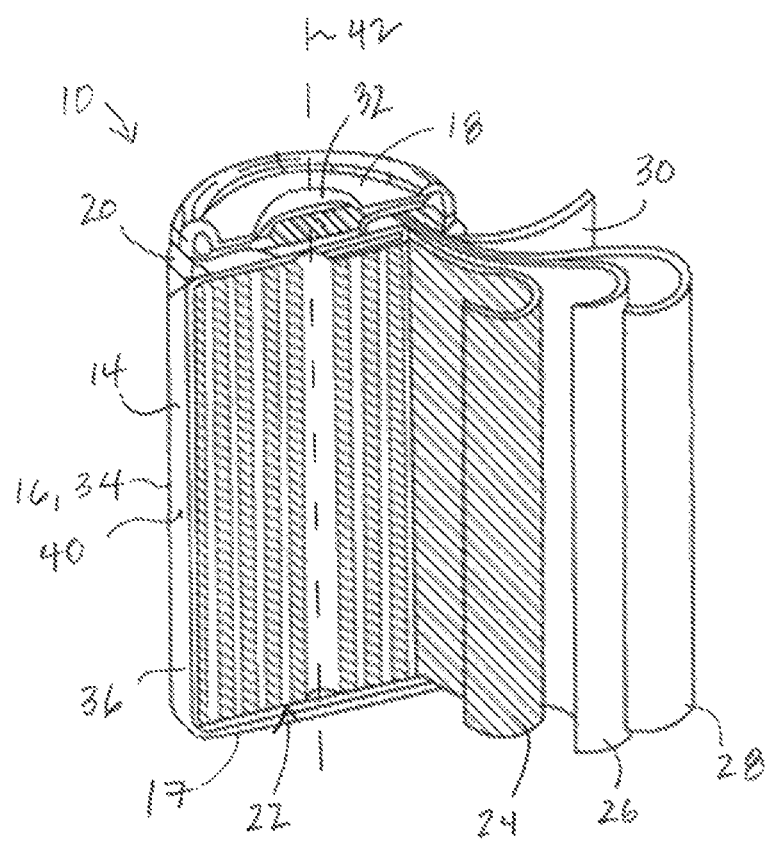
FIG. 3 is a cut-way perspective view of a cylindrical electrochemical cell.

Referring to FIGS. 1-3, a battery module 1, is used alone or in combination with other battery modules (not shown) to provide electrical power. The battery module 1 includes electrochemical cells 10 that are arranged in a side-by-side configuration to form a one-dimensional cell array 12, and are supported in a cell holder 100. In addition, the battery module 1 includes first and second current collectors 60, 80. The current collectors 60, 80 provide a parallel electrical connection between the cells 10 of the cell, array 12. In particular, the first current collector 60 provides an electrical connection between the terminals of one polarity, for example the positive terminals 32, of the cells 10 that form the cell array 12. Similarly, the second current collector 80 provides an electrical connection between terminals of the opposed polarity, for example the negative terminals 34, of the cells 10 that form cell array 12, as discussed in detail below.

The cells 10 are cylindrical lithium-ion cells. Each cell 10 includes a cylindrical cell housing 14 having a container portion 16 and a lid 18 that closes an open end of the container portion 16. The lid 18 is sealed to the container portion 16 by an electrically insulating gasket 20. The container portion 16 includes a closed end 17 that is disposed at an end of the cell housing 14 that is opposed to the lid 18, and a cell housing sidewall 36 that protrudes from the closed end 17. The container portion 16 is elongated along a longitudinal axis 42 that extends between the lid 18 (e.g., the cell housing first end) and the closed end 17 (e.g., the cell housing second end). That is, the longitudinal axis 42 extends in parallel to the cell housing sidewall 36.

An electrode assembly 22 is sealed within the cell housing 14 along with an electrolyte to form a power generation and storage unit. The electrode assembly 22 includes a stacked arrangement of a positive electrode 24, a first separator 26, a negative electrode 28 and a second separator 30, in which the stacked arranged has been rolled to provide a "jelly roll". One of the electrodes, for example the positive electrode 24, is electrically connected to the lid 18, which serves as a positive terminal 32 of the cell 10. In addition, the other electrode, for example the negative electrode 28, is electrically connected to the container portion 16, which serves as a negative terminal 34 of the cell 10.

Figure 5:
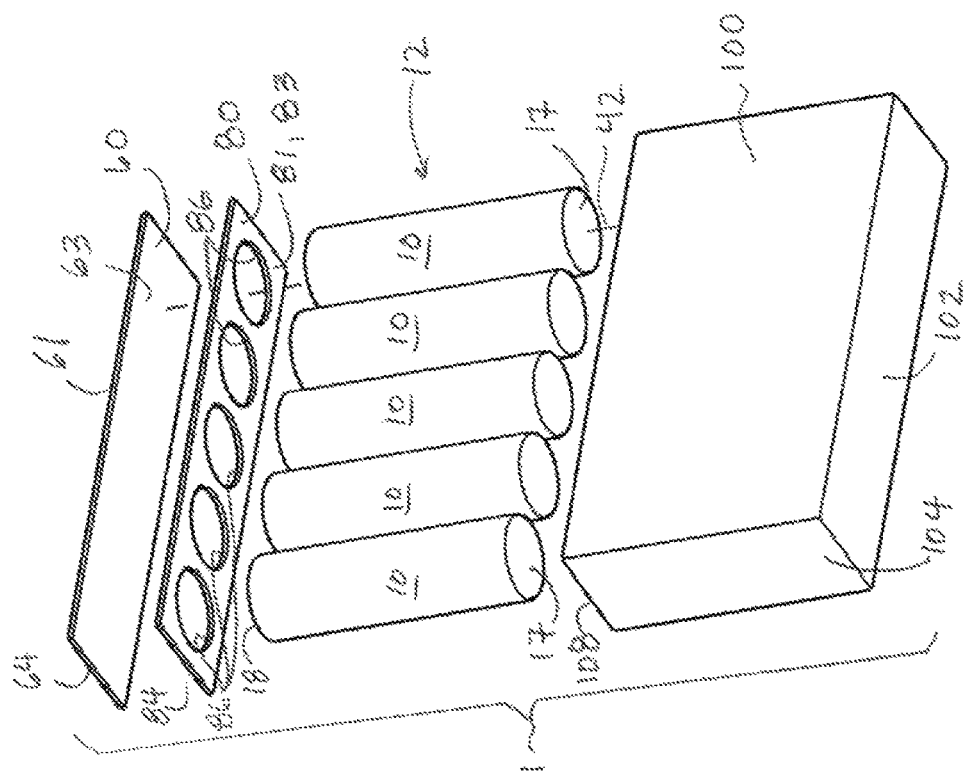
FIG. 5 is an exploded bottom perspective view of the battery module of FIG. 1.
Figure 4:
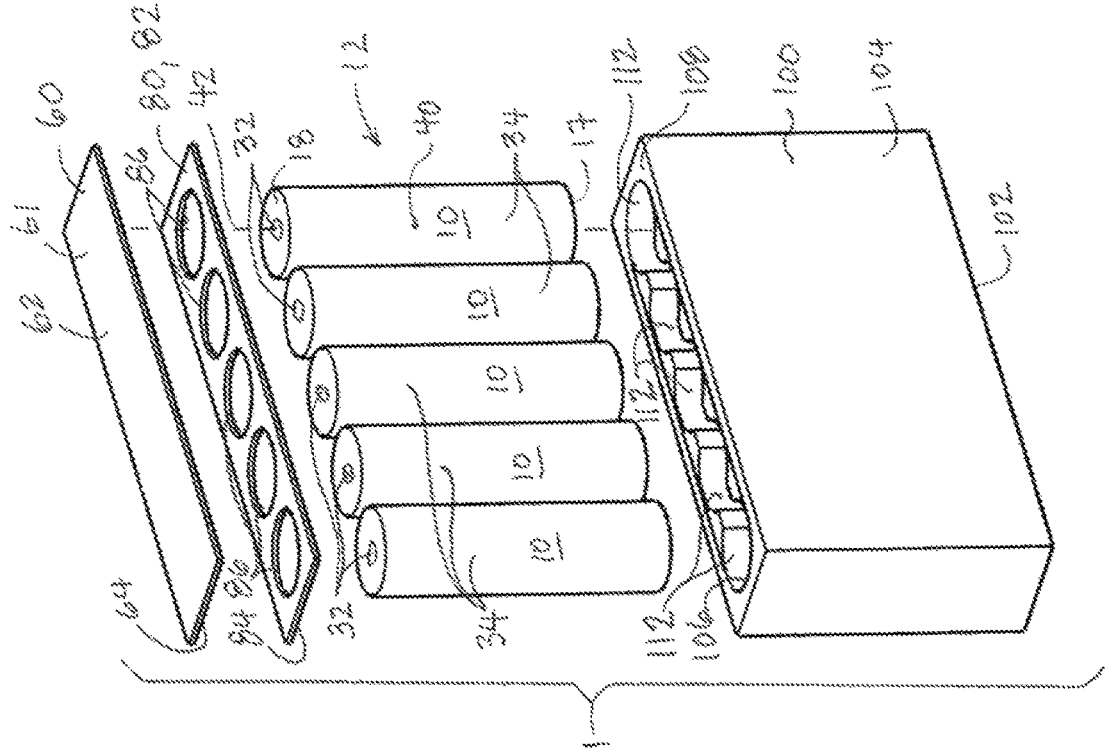
FIG. 4 is an exploded top perspective view of the battery module of FIG. 1.

Referring to FIGS. 4 and 5, the first current collector 60 includes a thin, electrically conductive first plate 61. The first plate 61 has a first plate first surface 62 that faces away from the cell array 12, and a first plate second surface 63 that is parallel to the first plate first surface 62 and that faces the second current collector 80. In addition, the first plate 61 includes a first plate peripheral edge 64 that extends between the first plate first surface 62 and the first plate second surface 63. In the illustrated embodiment, the first current collector 60 has a rectangular shape when viewed in top plan view (e.g., along an axis that is parallel to the longitudinal axis 42).

The first plate 61 is disposed at the first end of the cell housing 14 and abuts the first ends 18 of the cells 10. In particular, the first plate 61 is electrically connected to the positive terminals 32 of the cells 10 for example via a welding process such as laser welding, vibration welding, capacitative discharge welding, etc. In the illustrated embodiment, the first current collector is free of openings that are shaped and dimensioned to receive the cell housing sidewall therein. Although not illustrated here, in some embodiments, the first plate 61 may optionally include other openings, cut outs or through holes. Such other openings may be required, for example to facilitate electrical or mechanical connections between the first current collector 60 and ancillary or external structures.

The second current collector 80 includes a thin, electrically conductive second plate 81. The second plate 81 has a second plate first surface 82 that faces the first current collector 60, and a second plate second surface 83 that is parallel to the second plate first surface 82 and that faces the cell array 12. The second plate 81 includes a second plate peripheral edge 84 that extends between the second plate first surface 82 and the second plate second surface 83. The second current collector 80 has a shape, when viewed in top plan view, and dimensions that are the same as the shape and dimensions of the first current collector 60. Thus, in the illustrated embodiment, the second current collector 80 has a rectangular shape when viewed in top plan view.

In addition, the second plate 81 includes openings 86 that are spaced apart from the second plate peripheral edge 84, and extend between the second plate first surface 82 and the second plate second surface 83. The openings 86 are shaped and dimensioned to receive the cell housing sidewall 36 therein. In the illustrated embodiment, the cells 10 are cylindrical cells, and therefore the openings 86 are circular. In some embodiments, the openings 86 are dimensioned to receive the cell housings 14 via a press fit engagement, whereby the direct contact between the openings 86 and the corresponding cell housing sidewall 36 provides the electrical connection between the current collector 80 and the cell housing sidewall 36, and thus also the negative terminal 34. In other embodiments, the openings 86 are dimensioned to receive the cell housings 14 with a tolerance fit, and a weld is provided between the openings 86 and the corresponding cell housing sidewall 36 which ensures the electrical connection between the current collector 80 and the cell housing sidewall 36, and thus also the negative terminal 34.

Like the first current collector 60, the second current collector 80 is disposed at the first end of the cell housing 14. For example, the second current collector 80 is disposed between a cell housing midpoint 40 and the first current collector 60, where the cell housing midpoint 40 is disposed mid way between the cell housing first end 18 and the cell housing second end 17. In the illustrated embodiment, the second current collector 80 is disposed at the first end of the cell housing 14 at a location that is closely adjacent to, but spaced apart from, the first current collector 60 in a direction parallel to the longitudinal axis 42. The spacing between the first current collector 60 and the second current collector 80 is determined by isolation requirements that in turn depend on the voltage of the cell 10. In the illustrated embodiment, the space between the first current collector 60 and the second current collector 80 is free from structures other than the cell first ends.

The second current collector 80 is oriented so as to be parallel to the first current collector 60, and the first current collector 60 overlies the second current collector 80 as viewed along an axis that is parallel to the longitudinal axis 42. In addition, the first and second current collectors 60, 80 are disposed on opposed sides of the gasket 20.

The battery module 1 may optionally include the cell holder 100. The cell holder 100 provides support and/or restraint for the cells 10 of the cell array 12. In some embodiments, the cell holder 100 may also include features that permit cell cooling, as discussed further below. The cell holder 100 includes a base 102 and a cell holder sidewall 104 that is joined at one end to the base 102 and protrudes from the base 102 in a direction that is perpendicular to the base 102.

The cells 10 of the cell array 10 are disposed in the cell holder 100 so as to be surrounded by the cell holder sidewall 104. An inner surface 106 of the cell holder sidewall 104 is contoured to partially conform to the shape of the cell housing sidewall 36 and second end 17. As a result, the cell holder inner surface 106 includes vacancies 112 having a shape and dimensions that correspond to the shape and dimensions of at least a portion of an outer surface of the cell housing 14. The dimension of the cell holder sidewall 104 in a direction parallel to the longitudinal axis 42 is set so as to permit the cell first end 18 to, protrude out of the open end 108 of the cell holder 100, and to permit the electrical connections between the first and second current collectors 60, 80 and the cell terminals 32, 34 to be made outside the cell holder 100. In some embodiments, the second current collector 80 may be used to close the open end 108 of the cell holder 100.

Figure 6:
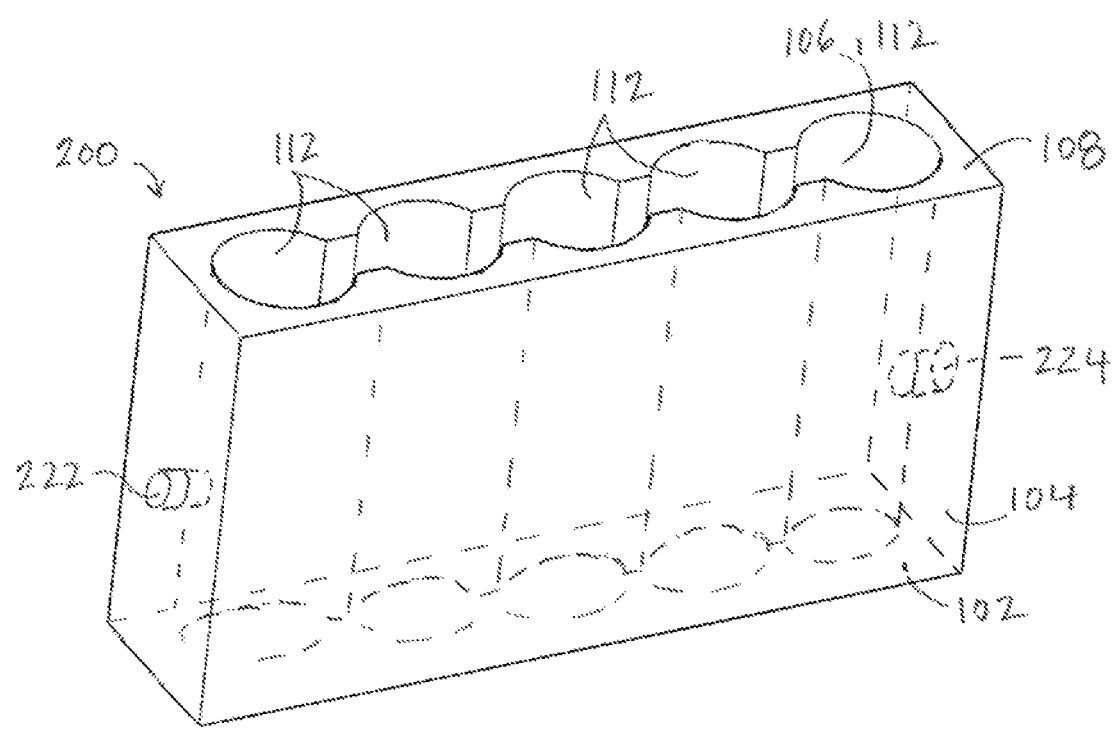
FIG. 6 is a perspective view of an alternative embodiment cell holder illustrating a cooling system in broken lines.

Referring to FIG. 6, an alternative embodiment cell holder 200 is configured to receive a coolant fluid and allow the coolant fluid to contact, and flow around, the outer surfaces of the cells 10. In such embodiments, the vacancies 112 closely fit the cell housings 36 at each end of the cell 10, but are widened in the vicinity of the midpoint 40 to permit free flow of a coolant fluid through the cell holder 100. To this end, the cell holder 200 may include a fluid inlet 222 at one side 114 of the cell holder 200, and a fluid outlet 224 at an opposed side 116 of the cell holder 200. The fluid inlet and outlet 222, 224 communicate with the vacancies 112, and allow coolant fluid to pass through the cell holder 200 and over the outer surfaces of the cells 10. In some embodiments, the second current collector 80 may be sealed to the open end 108 of the cell holder 200 and to the cell housing sidewalls 36 in order to retain coolant fluid within the cell holder 200. For example, a seal (not shown) may be disposed between the cell holder open end 108 and the second current collector second surface 83.

Figure 7:
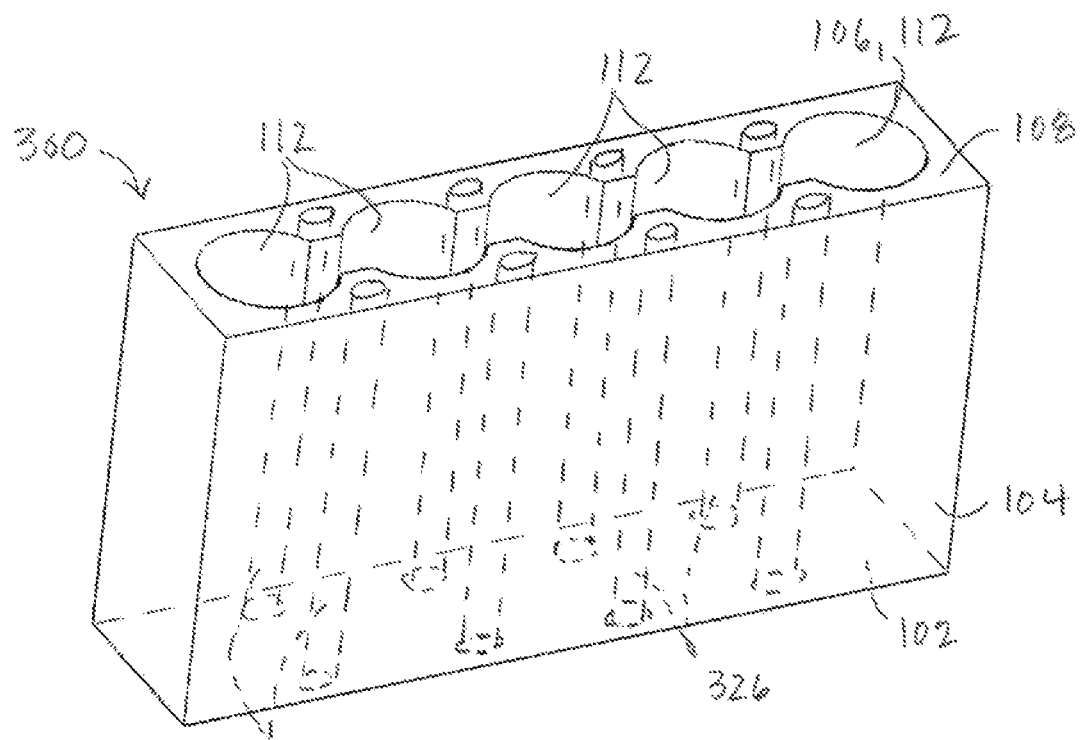
FIG. 7 is a perspective view of another alternative embodiment cell holder illustrating an alternative embodiment cooling system in broken lines.
Figure 8:
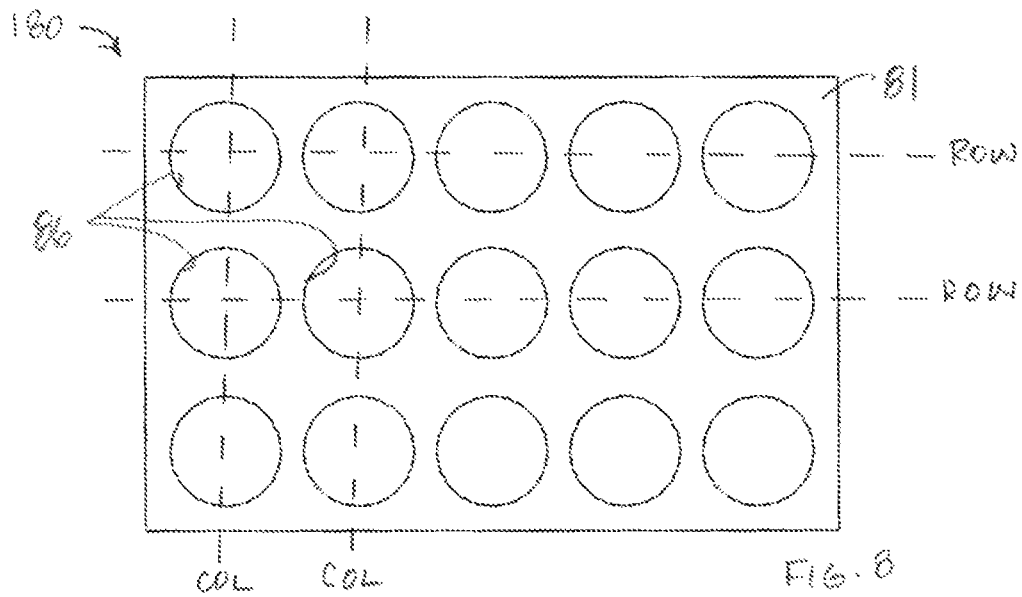
FIG. 8 is a top plan view of an alternative embodiment of the second current collector.

Referring to FIG. 7, another alternative embodiment cell holder 300 is configured to receive coolant fluid within fluid passages 326 provided within the cell holder 200. Although the fluid passages extend through the cell holder sidewall 104, they do not communicated with the vacancies 112, whereby the cell holder 300 functions as a heat exchanger in which heat generated by the cells 10 is conducted through the cell holder sidewall 104 to the fluid that passes through the fluid passages 326. Although the fluid passages 326 are illustrated as a series of parallel linear passages, the fluid passages 326 are not limited to this configuration. For example, in other embodiments (not illustrated), the fluid passages 326 may include one or more helical or serpentine passages that surround the cell array 12.

In the illustrated embodiment, the first current collector 60 and the second current collector 80 are formed of the same material. However, in other embodiments, the first current collector 60 is formed of a first material, and the second current collector 80 is formed of a second material that is different from the first material.

In the embodiment illustrated in FIGS. 1-5, the second current collector 80 includes five openings 86 that are arranged in a one-dimensional array, whereby the battery module 1 can accommodate five cells 10. It is understood, however, that a fewer or greater number of cells 10 could be electrically connected by the current collectors 60, 80. For example, the second current collector 80 is not limited to a 1×5 array of cells, and can be modified to accommodate a greater or fewer number of cells by increasing or decreasing the number of cut outs.

Figure 9:
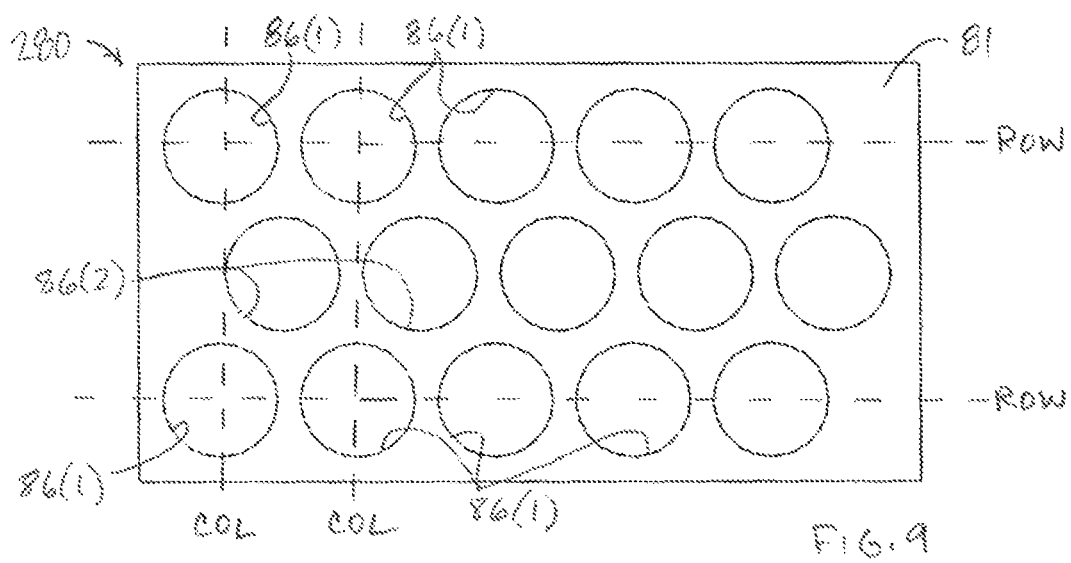
FIG. 9 is a top plan view of another alternative embodiment of the second current collector.
Figure 10:
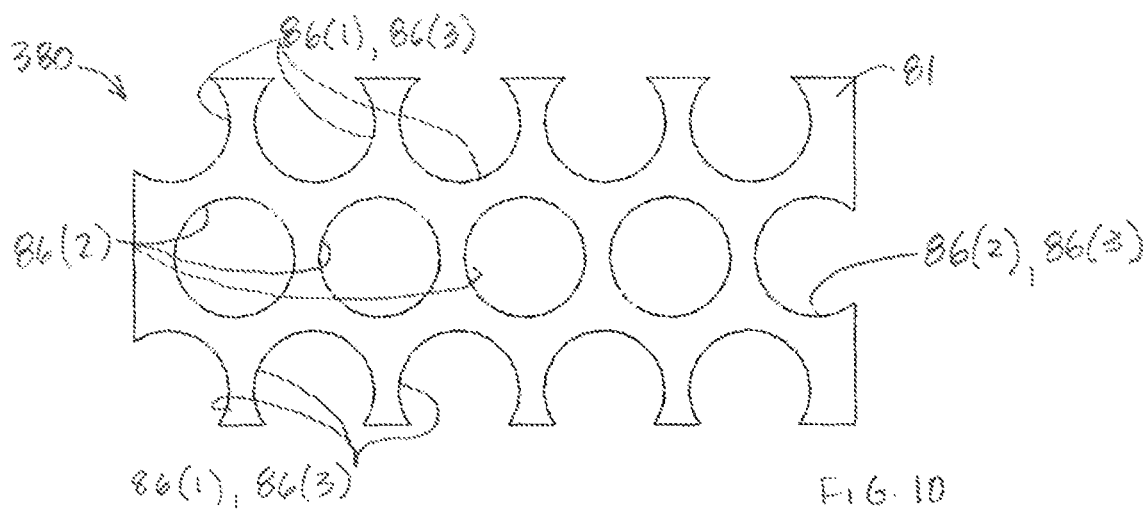
FIG. 10 is a top plan view of yet another an alternative embodiment of the second current collector.

Moreover, it is understood, that the first and second current collectors, 60, 80 are not limited to a one-dimensional array of openings 86, and can be modified to accommodate a two-dimensional array of cells 10. For example, an alternative embodiment second current collector 180 includes a 3×5 two-dimensional array of openings 86 that are arranged in rows and columns (FIG. 9). Another alternative embodiment second current collector 280 includes a 3×5 two dimensional array of openings 86 in which a first subset of the openings 86(1) are arranged in a grid (e.g., in rows and columns), and a second subset of the openings 86(2) are arranged in the interstitial spaces defined between the rows and columns occupied by the openings 86(1) of the first subset (FIG. 10). The arrangement of FIG. 10 may be advantageous relative to that shown in FIG. 9 due to more efficient packing of the cells within available space. In all embodiments, the first current collector 60 is shaped and dimensioned to provide an electrical connection between the positive terminals 32 of the two-dimensional array.

In the embodiment illustrated in FIGS. 1-10, the openings 86 are each provided in second current collector 80 at a location that is spaced apart from a peripheral edge thereof, whereby the openings 86 are spaced apart from the peripheral edge 84 of the second plate 81. However, in other embodiments, yet another alternative embodiment second current collector 380 includes a 3×5 two dimensional array of openings 86 in which the outermost openings 86(3), for example the openings 86(3) that are adjacent to the plate peripheral edge 84, may be provided at a location that intersects the plate peripheral edge 84. For a given number of openings 86 and arrangement of openings 86, providing the outermost openings 86(3) at a location that intersects the plate peripheral edge 84 reduces the overall length and width of the second plate 81, and thus also reduces material costs.

Although the cell 10 described in the illustrated embodiment is a lithium-ion electrochemical cell, the cells 10 that are connected using the clip are not limited to a lithium-ion electrochemical cell. For example, the cell 10 may be a nickel metal hydride, nickel cadmium cell, aluminium-ion cell or other type of cell. Moreover, although the cell 10 is described as having a cylindrical shape, the cell 10 may be formed in a different shape, such as a prismatic or a pouch shape.

Although the first and second current collectors 60, 80 are described as having a generally rectangular profile when seen in top plan view, the first and second current collectors 60, 80 are not limited to a rectangular shape. For example, in some embodiments, the first and second current collectors 60, 80 may be polygonal in shape, elliptical in shape, or have an irregular curvilinear shape, when seen in top plan view.

Although the positive electrode 24 is described here as being electrically connected to the lid 18, and the negative electrode 28 is described here as being electrically connected to the container portion 16, it is understood that the cell 10 may alternatively be configured so that the positive electrode 24 is electrically connected to the container portion 16, and the negative electrode 28 is electrically connected to the lid 18.

Selective illustrative embodiments of the battery module and current collectors are described above in some detail. It should be understood that only structures considered necessary for clarifying the battery module and current collectors have been described herein. Other conventional structures, and those of ancillary and auxiliary components of the battery module and current collectors, are assumed to be known and understood by those skilled in the art. Moreover, while working examples of the battery module and current collectors have been described above, the battery module and current collectors are not limited to the working examples described above, but various design alterations may be carried out without departing from the devices as set forth in the claims.

What is claimed is:

1. A battery module comprising:
a first current collector comprising an electrically conductive first plate having a first plate first surface, a first plate second surface that is parallel to the first plate first surface, and a first plate peripheral edge that extends between the first plate first surface and the first plate second surface;
a second current collector comprising an electrically conductive second plate having a second plate first surface, a second plate second surface that is parallel to the second plate first surface, a second plate peripheral edge that extends between the second plate first surface and the second plate second surface and an opening that extends between the second plate first surface and the second plate second surface; and
at least one electrochemical cell, each cell including
a cell housing having
a cell housing first end that has a first polarity and serves as a first terminal of the cell,
a cell housing second end that is opposed to the cell housing first end, and
a cell housing sidewall that extends between the cell housing first end and the cell housing second end, the cell housing sidewall having a second polarity and serving as a second terminal of the cell, the second polarity being different from the first polarity,
wherein
the cell is disposed in the opening in such a way that the second terminal of the cell directly contacts the opening and is electrically connected to the opening; and
the first plate second surface directly contacts the first terminal of the cell and is electrically connected to the first terminal of the cell.

2. The battery module of claim 1, wherein
the cell housing has a midpoint that is mid way between the first end and the second end, and
the second current collector is disposed between the midpoint and the cell housing first end.

3. The battery module of claim 1, wherein the cell housing sidewall is press fit in the opening.

4. The battery module of claim 1, wherein the cell housing sidewall is joined to the opening via a weld.

5. The battery module of claim 1, wherein the cell housing sidewall is electrically isolated from the cell housing first end.

6. The battery module of claim 1, wherein
the cell housing includes a longitudinal axis that extends through the cell housing first end and the cell housing second end, and
the first current collector is spaced apart from the second current collector in a direction parallel to the longitudinal axis.

7. The battery module of claim 1, comprising a cell holder that includes a base and a cell holder sidewall that is joined at one end to the base and protrudes from the base in a direction that is perpendicular to a surface of the base,
wherein the at least one cell is disposed in the cell holder so as to be surrounded by the cell holder sidewall, and the second current collector closes an end of the cell holder sidewall that is opposed to the one end.

8. The battery module of claim 1, comprising a cell holder that includes a base and a cell holder sidewall that is joined at one end to the base and protrudes from the base in a direction that is perpendicular to a surface of the base, and
an interior surface of the cell holder sidewall is contoured to provide vacancies having a shape and dimensions that correspond to the shape and dimensions of at least a portion of an outer surface of the cell housing.

9. The battery module of claim 1, comprising a cell holder that includes a base and a cell holder sidewall that is joined at one end to the base and protrudes from the base in a direction that is perpendicular to a surface of the base,
wherein a cooling channel is provided in the cell holder sidewall, the cooling channel including an inlet that permits coolant to be provided to the cell holder, and an outlet that permits coolant to be discharged from the cell holder.

10. A battery module comprising
an array of electrochemical cells, a first current collector and a second current collector, wherein
each cell includes a cell housing having
a cell housing first end that has a first polarity and serves as a first terminal of the cell,
a cell housing second end that is opposed to the cell housing first end,
a longitudinal axis that extends between the cell housing first end and the cell housing second end, and
a cell housing sidewall that extends between the cell housing first end and the cell housing second end, the cell housing sidewall having a second polarity and serving as a second terminal of the cell, the second polarity being different from the first polarity,
the first current collector comprises a first plate that is
disposed at the first end of the cell housing,
in direct contact with the first terminal of at least one electrical cell of the array, and
is electrically connected to the cell housing first end of the at least one electrical cell of the array, and
the second current collector comprises a second plate that is
disposed at the first end of the cell housing,
in direct contact with the second terminal of the at least one electrical cell of the array,
is electrically connected to the second tem final of the at least one electrochemical cell of the array,
is parallel to the first current collector,
underlies the first current collector along an axis that is parallel to the longitudinal axis of the cells,
is spaced apart from the first current collector, and
at least one of the first current collector and the second current collector forms the respective electrical connection with the at least one electrochemical cell of the array via the direct contact.

11. The battery module of claim 10, wherein
the cell housing has a midpoint that is mid way between the first end and the second end, and
the second current collector is disposed between the midpoint and the first current collector.

12. The battery module of claim 10, wherein the second current collector includes
a second plate first surface, a second plate second surface that is parallel to the second plate first surface, a second plate peripheral edge that extends between the second plate first surface and the second plate second surface and an opening that extends between the second plate first surface and the second plate second surface, the opening being shaped and dimensioned to receive the cell housing sidewall therein.

13. The battery module of claim 12, wherein the opening is shaped and dimensioned to receive the cell housing sidewall therein in a press fit configuration.

14. The battery module of claim 12, wherein the first current collector is free of openings that are shaped and dimensioned to receive the cell housing sidewall therein.

15. The battery module of claim 10, comprising a cell holder that includes a base and a cell holder sidewall that is joined at one end to the base and protrudes from the base in a direction that is perpendicular to a surface of the base,
wherein the at least one cell is disposed in the cell holder so as to be surrounded by the cell holder sidewall, and the second current collector closes an end of the cell holder sidewall that is opposed to the one end.

16. The battery module of claim 10, comprising a cell holder that includes a base and a cell holder sidewall that is joined at one end to the base and protrudes from the base in a direction that is perpendicular to a surface of the base, and
an interior surface of the cell holder sidewall is contoured to provide vacancies having a shape and dimensions that correspond to the shape and dimensions of at least a portion of an outer surface of the cell housing.

17. The battery module of claim 10, comprising a cell holder that includes a base and a cell holder sidewall that is joined at one end to the base and protrudes from the base in a direction that is perpendicular to a surface of the base,
wherein a cooling channel is provided in the cell holder sidewall, the cooling channel including an inlet that permits coolant to be provided to the cell holder, and an outlet that permits coolant to be discharged from the cell holder.

* * * * *

UNITED STATES PATENT AND TRADEMARK OFFICE
CERTIFICATE OF CORRECTION

PATENT NO. : 11,152,670 B2
APPLICATION NO. : 16/212140
DATED : October 19, 2021
INVENTOR(S) : Kotik It is certified that error appears in the above-identified patent and that said Letters Patent is hereby corrected as shown below:

In the Claims

In Claim 10, at Column 10, Line 1: "second tem final" should read --second terminal--.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*